United States Patent
Ji et al.

(10) Patent No.: US 10,536,256 B2
(45) Date of Patent: Jan. 14, 2020

(54) METHOD AND DEVICE FOR TRANSMITTING UPLINK CONTROL SIGNAL IN WIRELESS COMMUNICATION SYSTEM

(71) Applicants: Samsung Electronics Co., Ltd., Gyeonggi-do (KR); Yonsei University-Industry Foundation, Seoul (KR)

(72) Inventors: Hyoung-Ju Ji, Seoul (KR); Dae-Sik Hong, Seoul (KR); Youn-Sun Kim, Gyeonggi-do (KR); Jong-Hyun Bang, Gyeonggi-do (KR); Hyun-Soo Kim, Seoul (KR)

(73) Assignees: Samsung Electronics Co., Ltd. (KR); Yonsei University-Industry Foundation (KR)

( * ) Notice: Subject to any disclaimer, the term of this patent is extended or adjusted under 35 U.S.C. 154(b) by 0 days.

(21) Appl. No.: 15/563,749

(22) PCT Filed: Mar. 31, 2016

(86) PCT No.: PCT/KR2016/003322
§ 371 (c)(1),
(2) Date: Oct. 2, 2017

(87) PCT Pub. No.: WO2016/159681
PCT Pub. Date: Oct. 6, 2016

(65) Prior Publication Data
US 2018/0097607 A1    Apr. 5, 2018

(30) Foreign Application Priority Data
Mar. 31, 2015 (KR) ........................ 10-2015-0045377

(51) Int. Cl.
*H04L 5/14* (2006.01)
*H04L 5/00* (2006.01)
(Continued)

(52) U.S. Cl.
CPC ............. *H04L 5/1438* (2013.01); *H04B 7/26* (2013.01); *H04L 5/0053* (2013.01); *H04L 5/14* (2013.01);
(Continued)

(58) Field of Classification Search
CPC ............ H04L 5/1438; H04W 72/0413; H04W 72/046; H04W 72/042; H04W 72/1289; H04B 7/26
See application file for complete search history.

(56) References Cited

U.S. PATENT DOCUMENTS 7,996,035 B2   8/2011   Nguyen et al.
8,045,926 B2   10/2011  Martikkala et al.
(Continued)

FOREIGN PATENT DOCUMENTS

WO   WO 2013/027967   2/2013
WO   WO 2014/036025   3/2014

OTHER PUBLICATIONS

PCT/ISA/237 Written Opinion issued on PCT/KR2016/003322 (pp. 5).
(Continued)

*Primary Examiner* — Jackie Zuniga Abad
(74) *Attorney, Agent, or Firm* — The Farrell Law Firm, P.C.

(57) ABSTRACT

Disclosed is a 5G or pre-5G communication system for supporting a data transmission rate higher than that of a 4G communication system, such as LTE, and subsequent systems, and a method for transmitting an uplink control signal in a wireless communication system comprises the steps of:
(Continued)

transmitting information indicating a first frequency domain to which an uplink control signal is transmitted from a base station, which has determined to perform full-duplex based communication; and performing downlink reception through the remaining frequency domains excluding the first frequency domain.

20 Claims, 13 Drawing Sheets

(51) Int. Cl.
    *H04B 7/26*     (2006.01)
    *H04W 72/04*     (2009.01)
    *H04W 72/12*     (2009.01)

(52) U.S. Cl.
    CPC ....... *H04W 72/042* (2013.01); *H04W 72/046* (2013.01); *H04W 72/0413* (2013.01); *H04W 72/1289* (2013.01)

(56) References Cited

U.S. PATENT DOCUMENTS

| | | |
|---|---|---|
| 8,275,424 B2 | 9/2012 | McCoy |
| 2013/0083672 A1 | 4/2013 | Johansson et al. |
| 2013/0188530 A1 | 7/2013 | Pirskanen et al. |
| 2014/0219202 A1 | 8/2014 | Kim et al. |
| 2015/0043685 A1 | 2/2015 | Choi et al. |
| 2016/0234836 A1* | 8/2016 | Aiba .................. H04L 1/00 |
| 2016/0337108 A1* | 11/2016 | Choi ............... H04L 1/1812 |

OTHER PUBLICATIONS

PCT/ISA/210 Search Report issued on PCT/KR2016/003322 (pp. 3).

Ju, Hyungsik et al., Bi-Directional Use of Spatial Resources and Effects of Spatial Correlation, IEEE Transactions on Wireless Communications, vol. 10, No. 10, Oct. 2011 Copyright 2011 IEEE, pp. 3368-3379.

Duarte, Melissa et al., Design and Characterization of a Full-duplex Multi-antenna System for WiFi networks, IEEE Trans. Vehicular Tech., vol. 63, Mar. 1, 2014, pp. 1160-1177.

Bharadia, Dinesh et al., Full Duplex Radios, SIGCOMM Comput. Commun. Rev, vol. 43, No. 4, Aug. 1, 2013, pp. 375-386.

Goyal, Sanjay et al., Analyzing a Full-Duplex Cellular System, Information Sciences and Systems (CISS), 2013 47th Annual Conference on . . . , Mar. 20, 2013, pp. 6.

Goyal, Sanjay et al., Improving Small Cell Capacity with Common-Carrier Full Duplex Radios, Communications (ICC), 2014 IEEE International Conference on . . . Jun. 10, 2014, pp. 7.

* cited by examiner

METHOD AND DEVICE FOR TRANSMITTING UPLINK CONTROL SIGNAL IN WIRELESS COMMUNICATION SYSTEM

PRIORITY

This application is a National Phase Entry of International Application No. PCT/KR2016/003322, which was filed on Mar. 31, 2016, and claims priority to Korean Patent Application No. 10-2015-0045377 filed on Mar. 31, 2015, the content of each of which is incorporated herein by reference.

TECHNICAL FIELD

The present disclosure relates to a method and apparatus for transmitting an uplink (UL) control signal in a wireless communication system.

BACKGROUND ART

To satisfy demands for wireless data traffic having increased since commercialization of 4th-Generation (4G) communication systems, efforts have been made to develop improved 5th-Generation (5G) communication systems or pre-5G communication systems. For this reason, the 5G communication system or the pre-5G communication system is also called a beyond-4G-network communication system or a post-Long Term Evolution (LTE) system.

To achieve a high data rate, implementation of the 5G communication system in an ultra-high frequency (mm-Wave) band (e.g., a 60 GHz band) is under consideration. In the 5G communication system, beamforming, massive multi-input multi-output (MIMO), full dimensional MIMO (FD-MIMO), an array antenna, analog beamforming, and large-scale antenna technologies have been discussed to alleviate a propagation path loss and to increase a propagation distance in the ultra-high frequency band.

For system network improvement, in the 5G communication system, techniques such as an evolved small cell, an advanced small cell, a cloud radio access network (RAN), an ultra-dense network, a device to device (D2D) communication, a wireless backhaul, a moving network, cooperative communication, coordinated multi-points (CoMPs), and interference cancellation have been developed.

In the 5G system, advanced coding modulation (ACM) schemes including hybrid frequency-shift keying (FSK) and quadrature amplitude modulation (QAM) modulation (FQAM) and sliding window superposition coding (SWSC), and advanced access schemes including filter bank multi carrier (FBMC), non-orthogonal multiple access (NOMA), and sparse code multiple access (SCMA) have been developed.

Meanwhile, as one of methods for supporting an improved data rate, a full-duplex communication scheme has been considered in which one node performs transmission and reception at the same time. The full-duplex communication scheme ideally improve capacity up to by twice the capacity of a half-duplex communication scheme where a time or frequency resource is orthogonally used to perform transmission and reception. However, the full-duplex communication scheme performs transmission and reception at the same time, causing strong self-interference.

FIG. 1 shows a probability of non-detection of a physical uplink control channel (PUCCH) signal with respect to the amount of a residual self-interference (RSI) after cancellation of self-interference in a general full-duplex communication system. Herein, as an example of the PUCCH signal, an ACK/NACK signal is assumed. As shown in FIG. 1, as the amount of RSI increases, the performance of detection of an HARQ ACK/NACK signal sharply degrades. If an UL control signal is damaged by self-interference, both DL transmission quality and UL transmission quality may not be guaranteed. Therefore, to apply the full-duplex communication scheme, it is important to secure UL control signal transmission from self-interference.

A separated antenna scheme, which is one of methods for cancelling self-interference, is a technique for enabling the use of the same frequency and time resources by spatially separating transmission and reception using multiple antennas. Another scheme, a shared antenna scheme uses the same antenna for transmission and reception, and cancels self-interference by using a circulator device. With the development of self-interference cancellation techniques, study has been conducted to apply full-duplex communication to a cellular system for capacity increase of a communication system. When a base station (BS) and a user equipment (UE) communicate with each other using existing half-duplex communication, a time resource or a frequency resource is divided for transmission, such that a transmitting UE and a receiving UE may not operate at the same time or may not use the same frequency resource. As a result, in spite of no interference between a transmitting node and a receiving node, an overall frequency efficiency degrades due to division of the resource. On the other hand, when the full-duplex communication scheme is used in the cellular system, the BS and the UE perform transmission and reception at the same time, increasing frequency efficiency, in spite of increase of self-interference and interference between UEs. Such a gain may be further improved if self-interference or interference between UEs may be effectively controlled, and to smoothly manage the cellular system, there is a need for a method for protecting an interference element according to a type and an importance of a signal transmitted by a UE or a BS.

DETAILED DESCRIPTION OF THE INVENTION

Technical Problem

The present disclosure provides a method and apparatus for transmitting an uplink (UL) control signal in a wireless communication system.

Technical Solution

According to an embodiment of the present disclosure, a method for transmitting an uplink (UL) control signal in a wireless communication system includes transmitting information indicating a first frequency domain in which an UL control signal is transmitted from a base station (BS) that has determined to perform full-duplex communication and performing downlink (DL) reception through a remaining frequency domain except for the first frequency domain.

According to another embodiment of the present disclosure, a method for transmitting an UL control signal in a wireless communication system includes determining if there is a format of an UL control signal that punctures a resource region where a DL control signal received from the BS is received, in case of full-duplex communication and generating the UL control signal corresponding to the format and transmitting the UL control signal to the BS, if the format exists.

According to another embodiment of the present disclosure, a method for transmitting an UL control signal in a wireless communication system includes transmitting information indicating a first frequency domain in which an UL control signal of an allocated entire frequency domain, if determining to perform full-duplex communication and performing DL transmission through a remaining frequency domain except for the first frequency domain.

According to another embodiment of the present disclosure, a user equipment (UE) for transmitting an UL control signal in a wireless communication system includes a controller configured to recognize reception of information indicating a first frequency domain in which an UL control signal is transmitted from a BS that has determined to perform full-duplex communication and a transceiver configured to perform DL reception through a remaining frequency domain except for the first frequency domain under control of the controller.

According to another embodiment of the present disclosure, a UE for transmitting an UL control signal in a wireless communication system includes a controller configured to determine if there is a format of an UL control signal that punctures a resource region where a DL control signal received from the BS is received, in case of full-duplex communication and a transceiver configured to generate the UL control signal corresponding to the format and transmitting the UL control signal to the BS, if the format exists.

According to another embodiment of the present disclosure, a BS for transmitting an UL control signal in a wireless communication system includes a controller configured to control a transceiver to transmit information indicating a first frequency domain in which an UL control signal of an allocated entire frequency domain, if determining to perform full-duplex communication, and to control the transceiver to perform DL transmission through a remaining frequency domain except for the first frequency domain.

Effects of the Invention

The present disclosure proposes a transmission method for reducing self-interference caused by DL transmission of a resource region overlapping a resource region of an UL control signal, thereby reducing an influence of self-interference upon an UL control signal, adaptively protecting interference of a control signal according to an importance degree of a control signal or an influence of self-interference, and making it possible to obtain high communication system performance.

MODE FOR CARRYING OUT THE INVENTION

Figure 1:
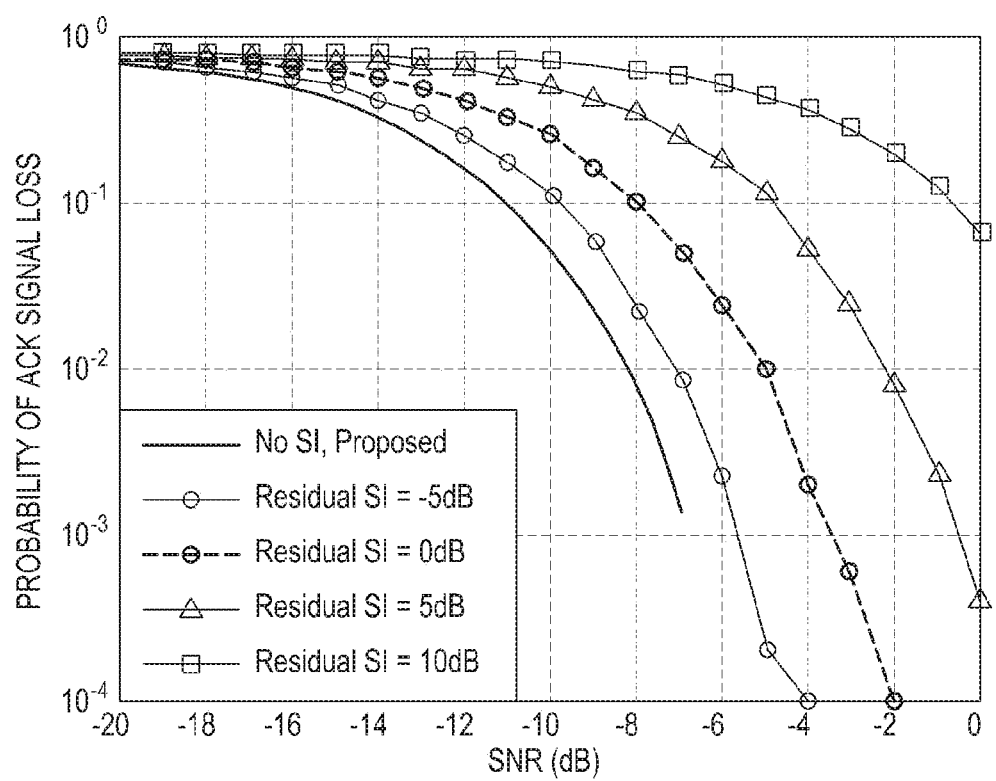
FIG. 1 shows a probability of non-detection of a PUCCH signal with respect to the amount of residual self-interference (RSI) after cancellation of self-interference in a general full-duplex communication system.

Hereinafter, the operating principles of exemplary embodiments of the present disclosure will be described with reference to the accompanying drawings. Like components are referred to as like reference numerals even through being illustrated in different drawings, and in the following description, a detailed description of related well-known functions or configurations will not be provided if it unnecessarily obscures the subject matter of the present disclosure. Further, the terminologies to be described below are defined in consideration of functions in the present disclosure and may vary depending on a user's or operator's intention or practice. Therefore, the definitions should be made based on the contents throughout the entire description of the present disclosure.

A control signal transmitted in an uplink (UL) direction from a user equipment (UE) to a base station (BS) in a general wireless communication system may include information about whether the UE has received a data packet transmitted in a downlink (DL) direction from the BS (e.g., a hybrid automatic retransmit request (HARQ) ACK/NACK signal), a scheduling request (SR) for an UL resource transmitted from the UE to the BS, feedbacks such as a channel quality indicator (CQI) including information about a quality of a radio channel and a multiple input multiple output (MIMO)-related feedback, a rank indicator (RI), a precoding matric indicator (PMI), etc.

For example, in Long Term Evolution (LTE) and LTE-Advanced (LTE-A) systems, a scheme for transmitting an UL control signal may be divided into two methods depending on whether an UL resource is allocated for an UL transmission channel of the UE, a UL-shared channel (SCH).

Figure 2:
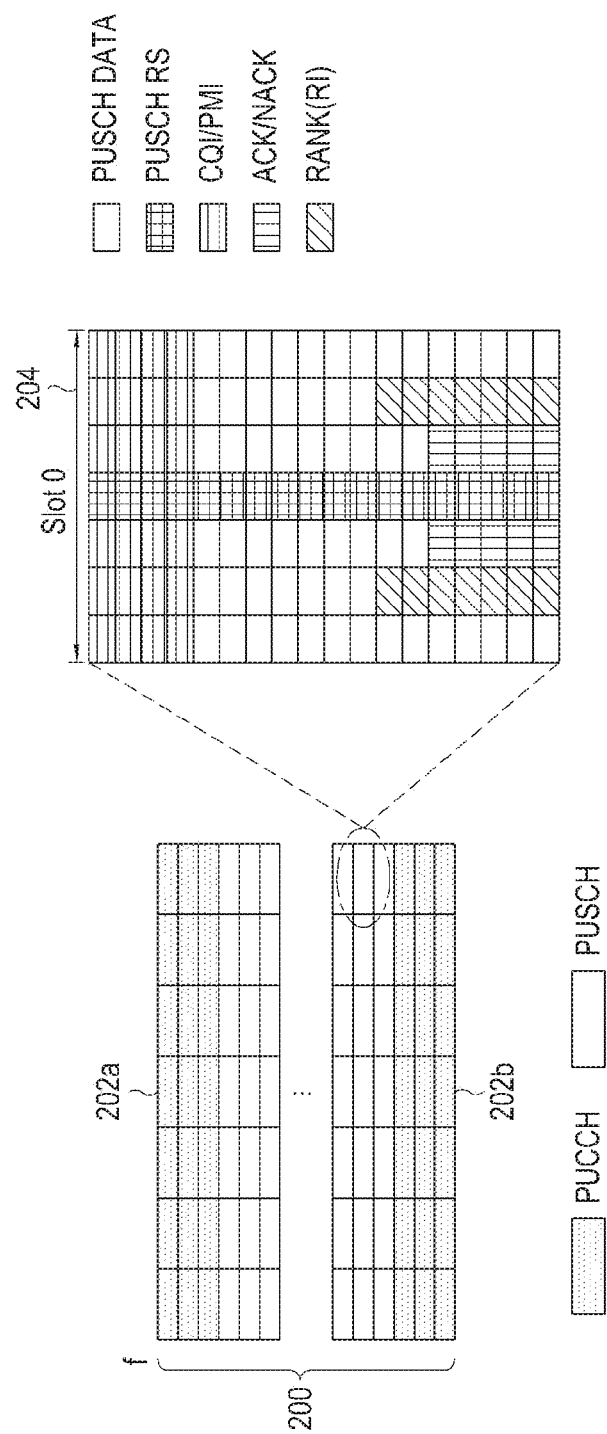
FIG. 2 shows an example of a channel structure of a PUCCH and a PUSCH in which an UL control signal is transmitted in an LTE communication system.

First, if the UE fails to receive UL scheduling information from the BS, the UL control signal is transmitted to the BS through a PUCCH that is a separate physical channel FIG. 2 shows an example of a channel structure of a PUCCH and a PUSCH in which an UL control signal is transmitted in an LTE communication system. Referring to FIG. 2, in an entire frequency band 200 allocated to a system, a PUCCH is allocated with edge frequency bands as indicated by reference numerals 202a and 202b. Thus, an UL control signal transmitted through the PUCCH is transmitted through the edge frequency bands 202a and 202b. Generally, in transmission of the UL control signal, one physical resource block is used to obtain a frequency diversity gain. For example, suppose that the uppermost part of a spectrum is used in the first slot of a frame in case of PUCCH transmission in the frame. Then, in the second slot, the lowermost part of the spectrum is occupied. The UL control signal carried in the PUCCH may include the aforementioned SR, HARQ ACK/NACK, CQI, RI, PMI, etc. A different format is supported according to corresponding information.

Next, if a UE receives effective UL scheduling information, an UL control signal is multiplexed in a scheduled UL-SCH region and is transmitted in a subframe allocated with a PUSCH transmission resource while maintaining single carrier characteristics. UL control signal information transmitted in a PUSCH includes an HARQ ACK/NACK, channel state information, and so forth. The UL control signal information transmitted through the PUSCH is multiplexed and transmitted in a predetermined position, for example, as shown in a slot 0 204 of FIG. 2.

Hereinafter, the present disclosure proposes a method for transmitting an UL control signal when full-duplex communication is applied in a wireless communication system. For convenience of a description, to describe an operation of the present disclosure, a DL and an UL will be assumed to operate based on an LTE system, but the present disclosure is not necessarily limited to the LTE system. Hereinbelow, an UL control signal transmitted through a PUCCH will be referred to as a PUCCH control signal, and an UL control signal transmitted through a PUSCH will be referred to as a PUSCH control signal.

First Embodiment: Use of One Frequency Band

A first embodiment of the present disclosure proposes a method for protecting a PUCCH control signal when one frequency band is used. More specifically, the first embodiment includes 1) a method for changing a bandwidth of a DL to protect a PUCCH control signal and 2) a method for changing a transmission format of a PUCCH to protect a PUCCH control signal.

1) Method for Changing a DL Bandwidth

Figure 3:
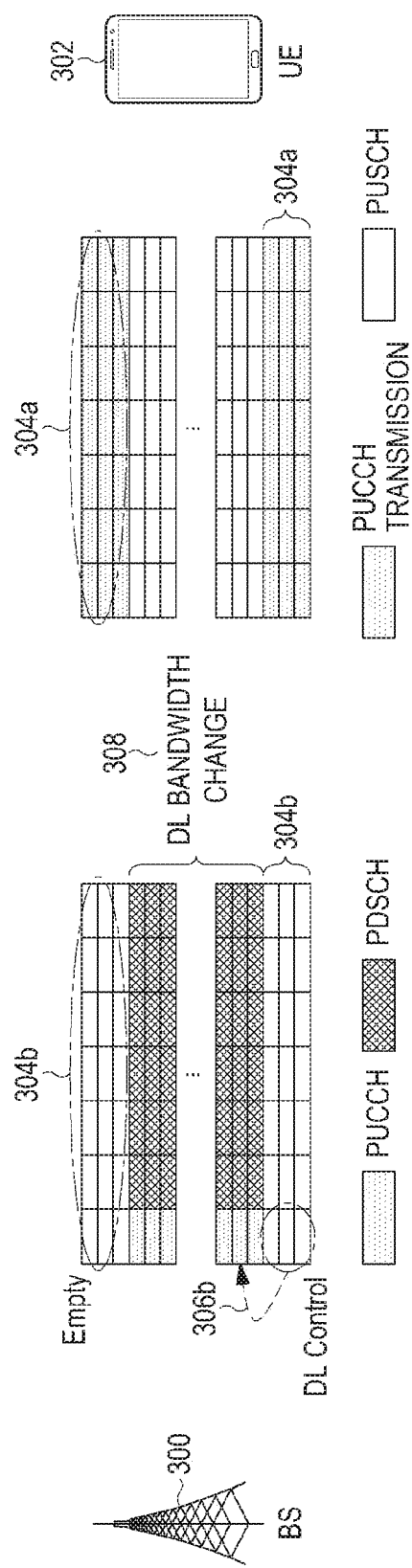
FIG. 3 illustrates an example of a method for changing a DL bandwidth according to an embodiment of the present disclosure.

In an embodiment of the present disclosure, to reduce self-interference occurring in transmission of a PUCCH control signal based on full-duplex communication, a frequency bandwidth allocated for a DL is reduced and DL transmission is performed in an entire frequency domain allocated to a system. FIG. 3 illustrates an example of a method for changing a DL bandwidth according to an embodiment of the present disclosure. Referring to FIG. 3, in an embodiment of the present disclosure, a BS 300 performs DL transmission through a remaining frequency band 308 while vacating frequency bandwidths 304b corresponding to edge frequency bandwidths 304a allocated to a PUCCH in the entire frequency domain allocated to DL transmission. Hence, a physical DL control channel (PDCCH) and a physical DL shared channel (PDSCH) are allocated to the remaining frequency band 308 as shown in FIG. 3, and a DL control signal is transmitted using a resource 306b corresponding to the PDCCH in the remaining frequency band 308.

A bandwidth required to be changed for protection of the PUCCH control signal is a frequency band overlapping a frequency band allocated to the PUCCH in an existing allocated DL bandwidth. In the PUCCH, a resource location or transmission timing used for transmission temporally changes with scheduling of a BS and a subframe to be transmitted. Therefore, to maximize frequency efficiency, variable bandwidth information needs to be dynamically transmitted. To this end, in an embodiment of the present disclosure, change information of a DL bandwidth is transmitted to the UE using DL control information (DCI) to be transmitted from the BS to the UE, thereby adjusting a DL bandwidth.

Figure 4A:
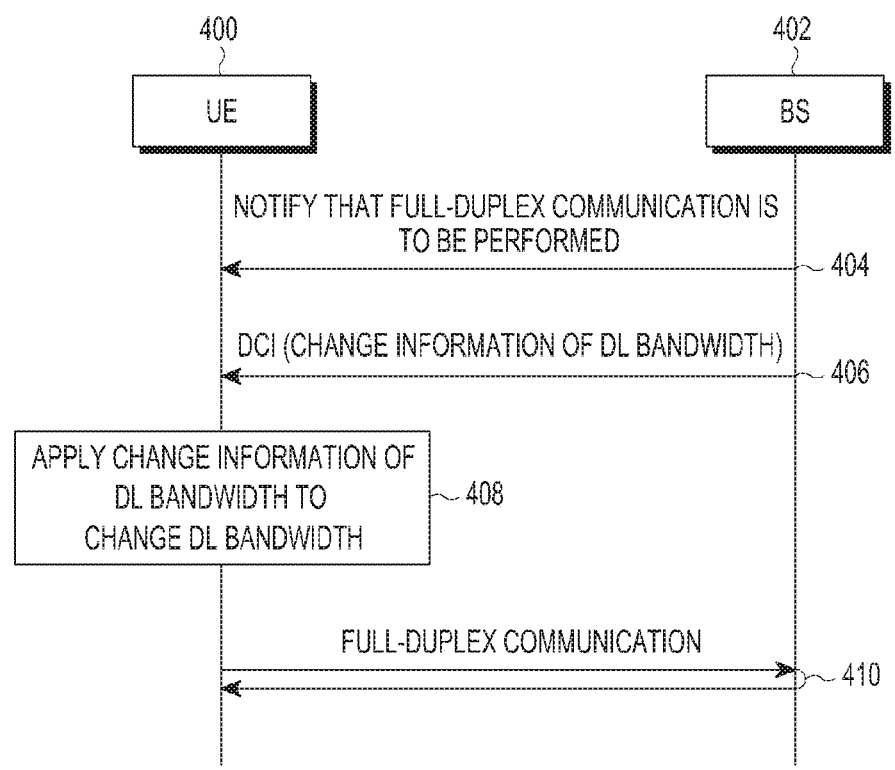
FIG. 4A is a flowchart illustrating an operation of changing a DL bandwidth using downlink control information (DCI) according to an embodiment of the present disclosure.

FIG. 4A is a flowchart illustrating an operation of changing a DL bandwidth using downlink control information (DCI) according to an embodiment of the present disclosure.

Figure 4B:
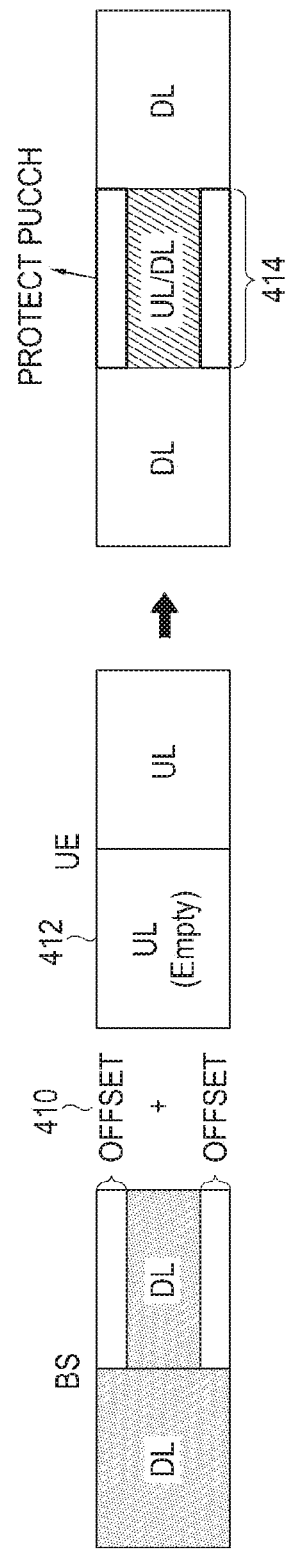
FIG. 4B shows an example where an offset of a DL bandwidth included in DCI is applied according to an embodiment of the present disclosure.

Referring to FIG. 4A, in operation 404, a BS 402 determines full-duplex communication and notifies a UE 400 that full-duplex communication is to be performed. In operation 406, the BS 402 transmits DCI including UL scheduling information to the UE 400. In this case, the DCI according to an embodiment of the present disclosure may include, for example, offset information indicating change information of a DL bandwidth. FIG. 4B shows an example where an offset of a DL bandwidth included in DCI is applied according to an embodiment of the present disclosure. Referring to FIG. 4B, offset information according to an embodiment of the present disclosure indicates frequency bands 410a and 410b corresponding to frequency bands allocated to a PUCCH in an existing allocated DL bandwidth.

Then, in operation 408, based on offset information obtained by performing DCI decoding, the UE 400 applies the frequency bands 410a and 410b indicated by the offset information to the existing allocated DL bandwidth. In operation 410, the UE 400 performs full-duplex communication with the BS 402 based on the change-applied DL bandwidth. More specifically, the UE 400 does not perform UL transmission as indicated by 412 during DL transmission of the BS 402. As indicated by 414, the UE 400 and the BS 402 transmit and receive UL data and control signal and data for a DL at the same time through a DL bandwidth to which the offset information is applied. In this case, a DL-related signal is transmitted only in a dashed band, and an UL control signal is transmitted in a non-dashed region, without self-interference caused by full-duplex communication.

Meanwhile, in a general LTE system, once a DL bandwidth is determined, the BS transmits information about a DL bandwidth to the UE using four bits of physical broadcast channel (PBCH) master information block (MIB). The BS repeats transmission of the MIB every 40 ms. The UE receives MIB during initial access and recognizes information about a DL bandwidth. Thus, in another embodiment of the present disclosure, change information of a DL bandwidth is transmitted to the UE through change of information of MIB, thereby adjusting a DL bandwidth.

Figure 5:
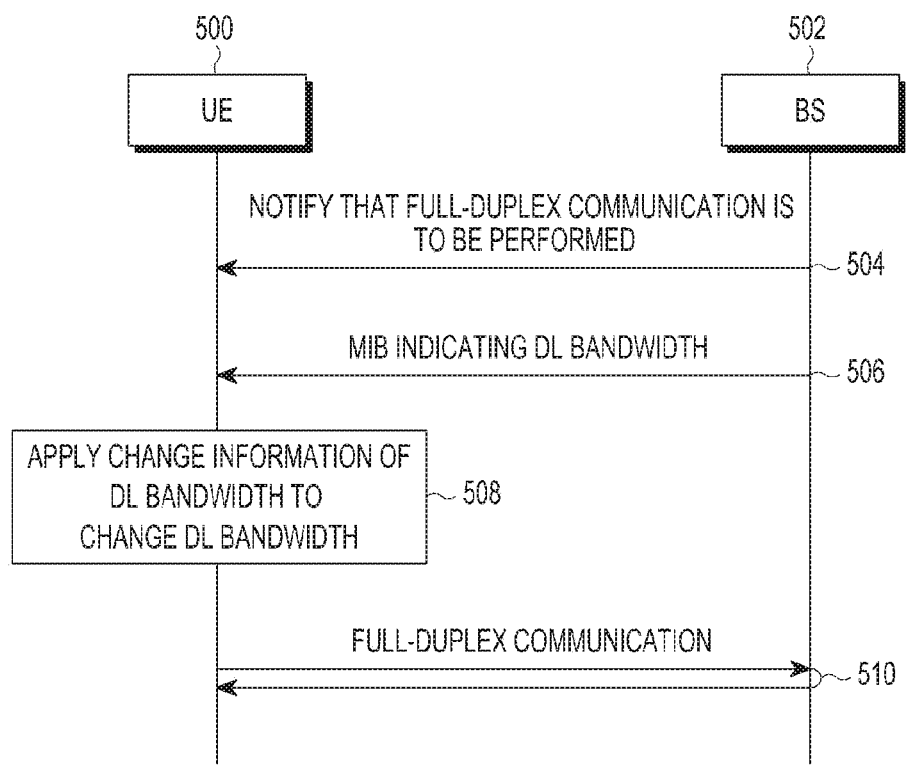
FIG. 5 is a flowchart illustrating an operation of changing a DL bandwidth using master information block (MIB) according to another embodiment of the present disclosure.

FIG. 5 is a flowchart illustrating an operation of changing a DL bandwidth using MIB according to another embodiment of the present disclosure.

Referring to FIG. 5, in operation 504, if a BS 502 determines to perform full-duplex communication, the BS 502 notifies a UE 500 that full-duplex communication is to be performed. In operation 506, the BS 502 transmits MIB including change information of a DL bandwidth to the UE 500. More specifically, if whether to perform full-duplex communication is determined periodically, the BS 502 incorporates the change information of the DL bandwidth in the MIB delivered to the UE every 40 ms through a PBCH. If whether to perform full-duplex communication is aperiodically determined, when change information of a DL bandwidth is generated, the BS 502 incorporates the generated change information of the DL bandwidth in MIB and transmits the same through the MIB during repeated transmission of the MIB.

According to another embodiment of the present disclosure, the MIB including the change information of the DL bandwidth may be included as the offset information indicating the frequency band allocated to the PUCCH, for example, as shown in Table 1. The PUCCH uses a maximum of N resource blocks in each of both edges of the UL bandwidth allocated to the system. Thus, in another embodiment of the present disclosure, as shown in Table 1, by adding one bit to existing MIB including four bits, offset information corresponding to N resource blocks used by the PUCCH may be indicated by a total of five bits for the changed DL bandwidth.

TABLE 1

| Conventional DL Bandwidth Configuration | | DL Bandwidth Configuration for PUCCH Protection | |
|---|---|---|---|
| Bandwidth | MIB Information | Bandwidth | MIB Information |
| 10 MHz | 1111 | 8.8 MHz | 11111 |

As shown in Table 1, if an existing allocated entire frequency bandwidth is 10 MHz, MIB information including four bits is configured with five bits to indicate offset information of the change-applied frequency band, such that a DL bandwidth is changed to 8.8 MHz.

Meanwhile, in a general LTE system, bandwidths of 1.4/3/5/10/15/20 MHz are supported. When a bandwidth for each of a DL and an UL is set differently using the bandwidths, a PUCCH control signal located at an edge in the entire frequency band allocated to the system may be protected. For example, let us the entire frequency bandwidth operating at 10 MHz. Then, a BS 502 according to another embodiment of the present disclosure sets a bandwidth of a DL to be used for full-duplex communication to a maximum bandwidth including the remaining bandwidth except for the bandwidth allocated to the PUCCH from the entire frequency bandwidth from among the supported bandwidths, and is assumed to change the bandwidth to, for example, 5 MHz. In this case, the BS 502 incorporates bits indicating the changed bandwidth of the DL in MIB and transmits the same to a UE 500 through the MIB.

In operation 508, the UE 500 changes a DL bandwidth based on information of the changed DL bandwidth obtained by decoding the MIB received from the BS 502. In operation 510, the UE 500 performs full-duplex communication with the BS 502 based on the change DL bandwidth.

2) Change of PUCCH Transmission Format

If a DL bandwidth is changed according to an embodiment of the present disclosure, the UE needs to dynamically recognize and receive a PDCCH transmission bandwidth. Therefore, in another embodiment of the present disclosure, a PUCCH control signal is transmitted by changing a PUCCH transmission format while maintaining a DL bandwidth.

Figure 6:
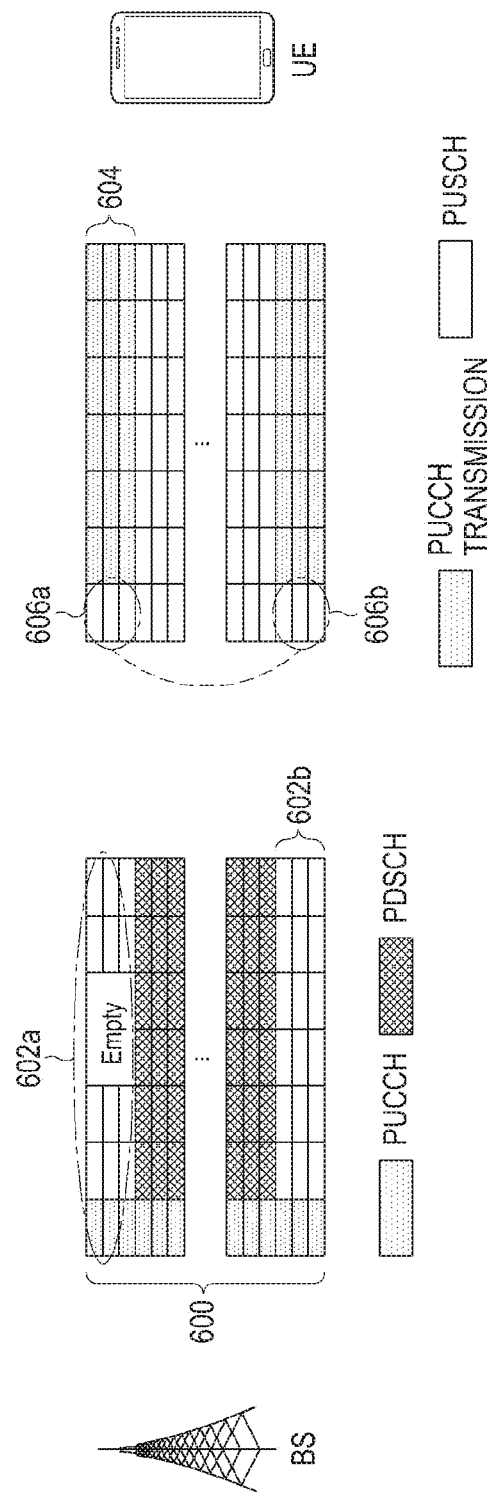
FIG. 6 illustrates an example of a transmission format of a PUCCH changed according to another embodiment of the present disclosure.

FIG. 6 illustrates an example of a transmission format of a PUCCH changed according to another embodiment of the present disclosure.

Referring to FIG. 6, to prevent interference of a DL control signal from occurring due to full-duplex communication and to guarantee performance of a PUCCH, a BS according to another embodiment transmits a PUCCH control signal without scheduling in a PDSCH in frequency bands 602a and 602b overlapping a frequency domain of the PUCCH in a DL frequency domain 600 allocated to the system. The UE punctures the frequency bands 602a and 602b corresponding to a frequency band in which a PDCCH of the BS is transmitted in an existing allocated frequency band 604 of the PUCCH to change the format of the PUCCH. If the UL control signal is transmitted through the changed PUCCH format, interference is not caused by the PUCCH control signal of the UE in the resource domain where a control signal is transmitted through the PDCCH of the BS. To transmit the changed format of the PUCCH, the UE uses the changed format of the PUCCH to transmit feedback information to the BS. According to an embodiment, the BS may transmit signaling indicating the changed format of the PUCCH to a higher layer. In this case, the UE uses the same PUCCH format regardless of whether the PDCCH is transmitted and the amount of occupied resources.

According to another embodiment, the UE may apply a method in which the amount of resources transmitted through the PDCCH of the BS is recognized and first some symbols are not transmitted in the existing PUCCH format determined based on the recognized amount of resources. In this case, the UE may determine whether the PDCCH overlaps a resource domain allocated to the existing PUCCH to determine a PUCCH transmission timing.

Generally, in the PUCCH, an UL control signal is transmitted using two time slots of one sub frame and eleven different formats are supported according to transmitted information. The UE informs the BS of a format to be used using UL control information during transmission of the PUCCH control signal. However, as described before, if the resource domain overlapping the PDCCH is vacated, support is not possible with a conventional PUCCH transmission scheme, and thus control information has to be generated in a new format.

Figure 7A:
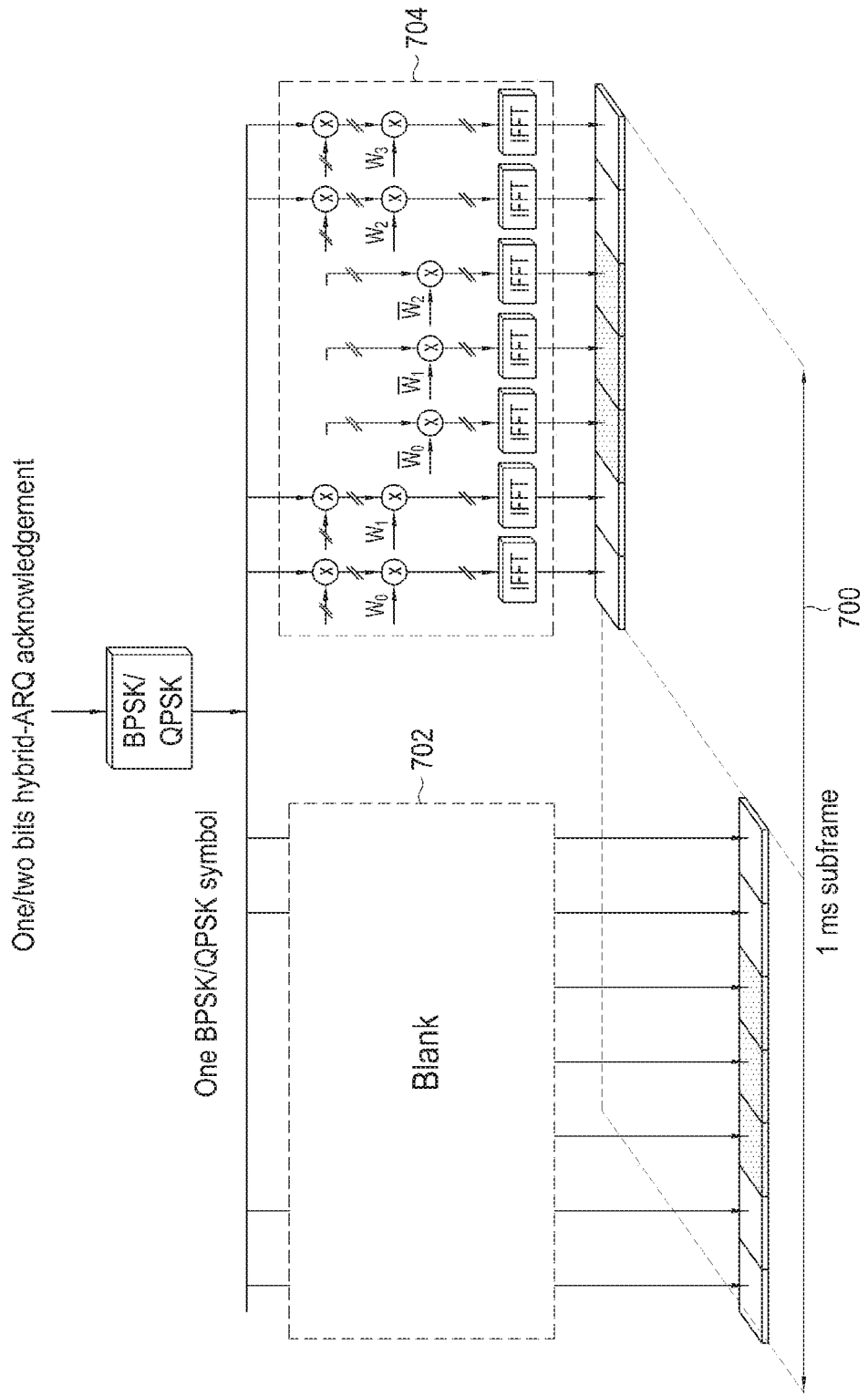
FIG. 7A illustrates an example of change of an UL control information format 1 used in transmission of an HARQ signal in a PUCCH control signal according to an embodiment of the present disclosure.

More specifically, FIG. 7A illustrates an example of change of an UL control information format 1 used in transmission of an HARQ signal in a PUCCH control signal according to an embodiment of the present disclosure. The existing UL information format 1 transmits the same HARQ signal in two time slots to obtain diversity. However, according to an embodiment of the present disclosure, when the resource domain overlapping the PDCCH is vacated in the resource domain of the PUCCH, a minimum of three OFDM symbols of the first time slot corresponding to the PDCCH has to be vacated. Referring to FIG. 7A, an HARQ signal is transmitted in a second time slot 704 without being transmitted in a first time slot 702 in one sub frame 700. In the present disclosure, if a format of a PUCCH control signal is changed, the UE informs the BS of information about the format by using UL control information (UCI).

Figure 7B:
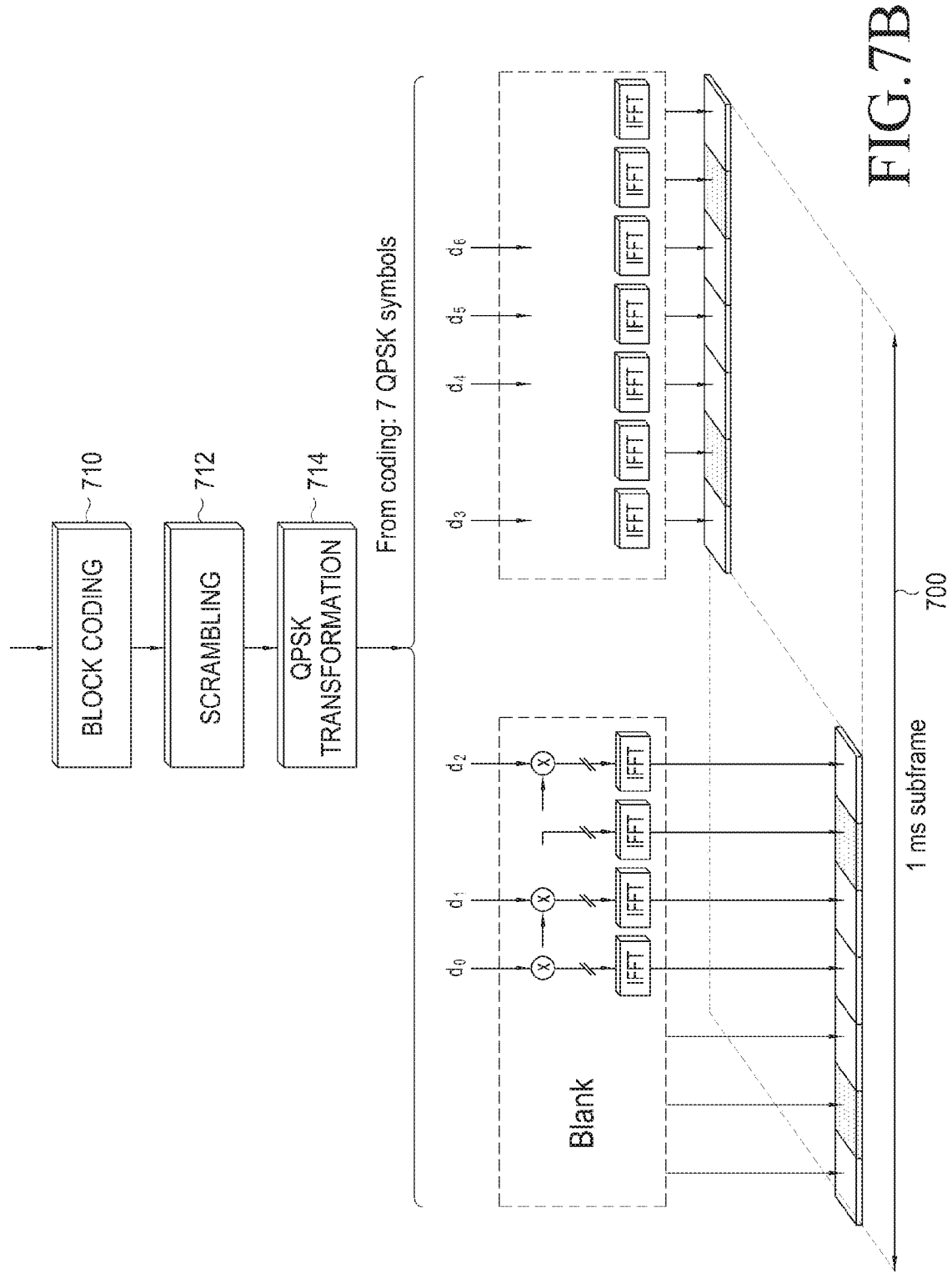
FIG. 7B illustrates an example of change of an UL control information format 2 used in transmission of CSI in a PUCCH control signal according to an embodiment of the present disclosure.

In another example, FIG. 7B illustrates an example of change of an UL control information format 2 used in transmission of CSI in a PUCCH control signal according to an embodiment of the present disclosure.

The existing CSI information is transformed into ten QPSK symbols through block coding 710 and scrambling 712. The ten QPSK symbols are transmitted as fourteen OFDM symbols including four demodulation reference signals (DM-RSs). Thus, to vacate three OFDM symbols of a PUCCH overlappingly transmitted in a resource domain where a PDCCH is transmitted, referring to FIG. 7B, CSI information generates a total of seven QPSK symbols through block coding and scrambling in operations 710 through 714. The QPSK-transformed symbols are transmitted through eleven OFDM symbols. The UE previously receives the changed format of the CSI information from the BS and transmits a PUCCH control signal to which the new format is applied based on the changed format of the CSI information. In an embodiment of the present disclosure, a new UL control signal format may be configured by vacating an UL control signal symbol that may be overlappingly transmitted with a DL control channel N indicates the number of vacated symbols, and a minimum of one symbol to a maximum of three symbols among symbols of the UL control signal are vacated. According to an embodiment, information about N may be transmitted in advance to the UE through high-layer signaling or the UE may previously determine the amount of interference and determine N. According to another embodiment, the UE may receive a physical control format indicator channel (PCFICH) in a first symbol of the PUCCH signal to receive possible DL control region information and may determine N to be 2 or 3.

Second Embodiment: Use of One or More Frequency Bands

Figure 8A:
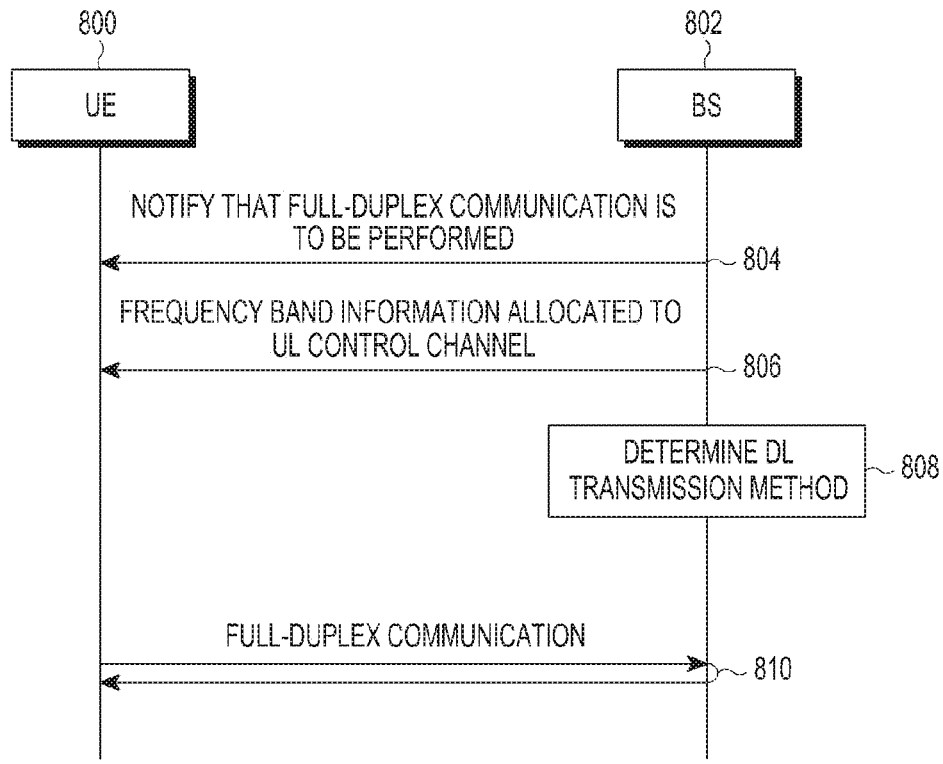
FIG. 8A is a flowchart illustrating an operation of protecting an UL control signal when one or more frequency bands are used according to a second embodiment of the present disclosure.

Hereinbelow, a second embodiment of the present disclosure proposes a method for protecting a PUCCH control signal when one or more frequency bands are used. FIG. 8A is a flowchart illustrating an operation of protecting an UL control signal when one or more frequency bands are used according to a second embodiment of the present disclosure. For convenience, as a detailed example, a system to which the second embodiment of the present disclosure is applied is assumed to use two frequency bands.

Referring to FIG. 8A, in operation 804, a BS 802 determines to perform full-duplex communication and notifies a UE 800 that full-duplex communication is to be performed. In operation 806, the BS 802 determines a frequency band allocated to an UL control channel between two operating frequency bands, for example, a partial band of a second frequency band, and transmits information about the determined frequency band to the UE 800 through high-layer signaling. In operation 808, the BS 802 determines a transmission method for a DL. For example, the BS 802 may configure a transmission method in which a DL control channel is not received by the UE 800 in a frequency band allocated to an UL control channel, thereby transmitting high-layer signaling to the UE 800. In this case, the UE 800 may secure performance generated due to a failure in using the frequency band allocated for transmission of an UL control channel by receiving a DL data channel through a resource domain corresponding to the UL control channel. The information of the UL control channel transmitted through the second frequency band may be received in a first frequency band or using control channel information transmitted through a data channel region of the second frequency band.

Figure 8B:
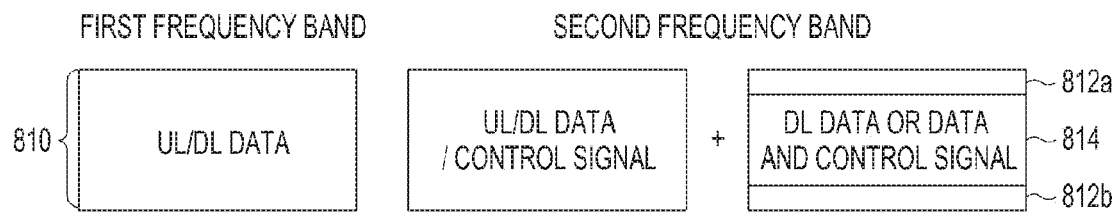
FIG. 8B shows an example of a transmission method when a BS is configured to transmit and receive an UL control signal and a DL control signal in the same frequency band according to another embodiment.

In an embodiment, the BS may transmit an UL control signal and a DL control signal through different frequency bands. Also in this case, after configuring the transmission method through high-layer signaling, the BS delivers the determined DL transmission method to the UE. FIG. 8B shows an example of a transmission method when a BS is configured to transmit and receive an UL control signal and a DL control signal in the same frequency band according to another embodiment. Referring to FIG. 8B, the BS 802 is configured to transmit and receive UL data and DL data through the first frequency band. The BS 802 is also configured to transmit UL data and control signal and DL data or data and control signal through the second frequency band. In this case, the BS 802 may be configured to transmit a DL control signal and data through a remaining frequency band 814 except for parts 812a and 812b overlapping a frequency band in which an UL control signal is transmitted in a frequency band 810 allocated for a DL.

In operation 810, the UE 800 and the BS 802 perform full-duplex communication to correspond to the determined transmission scheme.

Third Embodiment: Protection in which a PUSCH Control Signal is Transmitted Using a PUCCH In a PUSCH, UL data and an UL control signal are transmitted together and thus it is difficult to protect only a control signal from self-interference. Therefore, a third embodiment of the present disclosure proposes a scheme for protecting a control signal by transmitting a control signal transmitted in the PUSCH through a PUCCH.

Figure 9A:
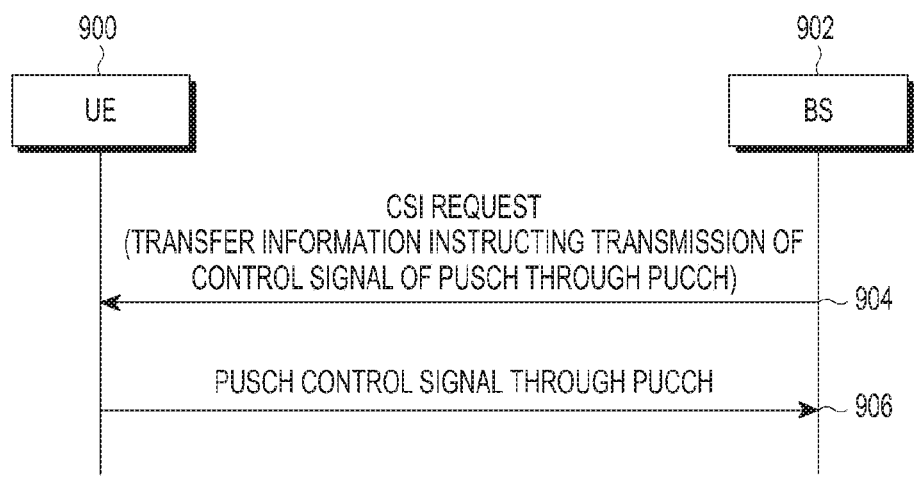
FIG. 9A is a flowchart illustrating an operation of transmitting a PUSCH control signal through a PUCCH according to an embodiment of the present disclosure.

FIG. 9A is a flowchart illustrating an operation of transmitting a PUSCH control signal through a PUCCH according to an embodiment of the present disclosure.

Figure 9B:
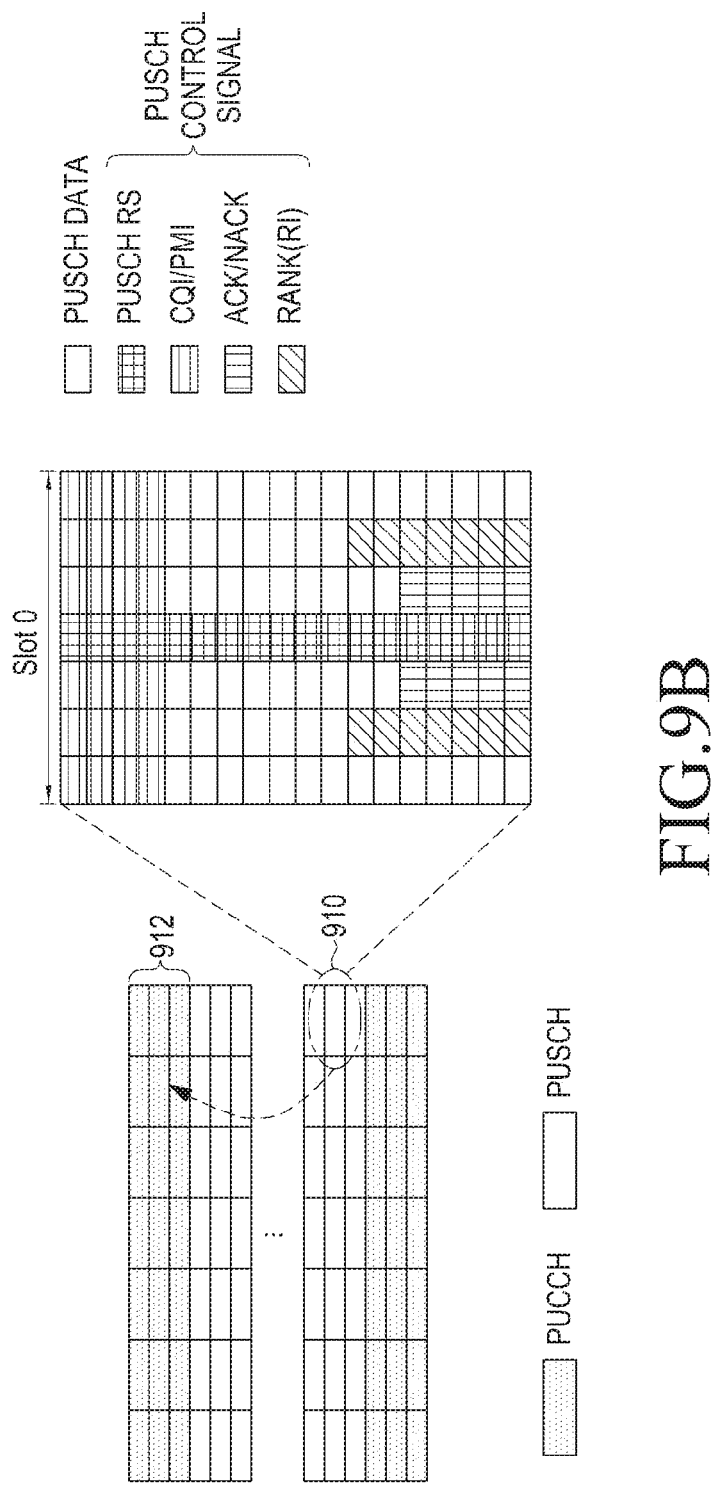
FIG. 9B shows an example of a scheme in which a PUSCH control signal is transmitted through a PUCCH according to an embodiment of the present disclosure.

Referring to FIG. 9A, a BS 902 having determined full-duplex communication transmits transfer information instructing the UE 900 to perform transmission of a PUSCH control signal through a PUCCH when sending a CSI request to a UE 900 in operation 904. Then, in operation 906, the UE 900 having received the transfer information transmits PUSCH control signal by using the PUCCH. FIG. 9B shows an example of a scheme in which a PUSCH control signal is transmitted through a PUCCH according to an embodiment of the present disclosure. Referring to FIG. 9B, a signal of a region 910 in which the PUSCH control signal is transmitted is transmitted through a PUCCH 912.

Depending on a required circumstance, the third embodiment of the present disclosure may be divided into a first method for transmitting a PUSCH control signal only through a PUCCH, a second method for transmitting a PUSCH control signal at the same time through a PUSCH and a PUCCH, and a third method for transmitting a specific PUSCH control signal through a PUCCH.

1) First Method:

It is assumed that more transmission of UL data is required in a full-duplex communication process. In this case, the BS 902 incorporates transfer information instructing the UE 900 to perform transmission of a PUSCH control signal through a PUCCH into a CSI request as in operation 904 of FIG. 9A, and transmits the transfer information to the UE 900 through the CSI request. The UE 900 having received the transfer information transmits the PUSCH control signal using the PUCCH, and uses the PUSCH only for UL data transmission.

2) Second Method:

If an influence of self-interference is large or simultaneous transmission of a PUCCH and a PUSCH is possible, the BS 902 incorporates transfer information instructing the UE 900 to perform simultaneous transmission of a PUSCH control signal through a PUCCH together with a PUSCH into a CSI request as in operation 904 of FIG. 9A, and transmits the transfer information to the UE 900 through the CSI request. In the second method, the UE 900 transmits the PUSCH control signal also through the PUCCH, thereby improving stability of the PUSCH control signal.

3) Third Method:

If a resource allocated to a PUCCH is instantaneously insufficient or an important PUSCH control signal needs to be additionally protected, the BS 902 incorporates transfer information instructing the UE 900 to perform transmission of only a specific control signal through a PUCCH in a CSI request as in operation 904 of FIG. 9A and transmits the transfer information to the UE 900 through the CSI request. For example, assuming a case where an HARQ ACK/NACK signal needs to be additionally protected, the BS 902 delivers transfer information instructing the UE 900 to perform transmission of the HARQ ACK/NACK signal through the PUCCH to the UE 900, such that the UE 900 transmits the HARQ ACK/NACK signal of the PUSCH control signal through the PUCCH. In this way, the HARQ ACK/NACK signal, which is important feedback information of the PUSCH, may be additionally protected.

According to another embodiment, if at least two frequency bands are used, the BS allocates one frequency band to the PUSCH and a frequency band that is different from the PUSCH-allocated frequency band to the PUCCH. Then, the allocation information is transmitted to the UE 900 through the CSI request as in operation 904 of FIG. 9A.

Meanwhile, the CSI request according to the third embodiment of the present disclosure may be configured to indicate the above-described transfer information for each embodiment in a CSI request field as shown in Table 2.

TABLE 2

| Description | CSI request field | CSI request field for full duplex |
|---|---|---|
| No aperiodic CSI report | 0 | 000 |
| Aperiodic CSI report in Half-duplex | 1 | 001 |
| Aperiodic CSI report in Full-duplex for PUCCH transmission | X | 010 |
| Aperiodic CSI report in Full-duplex for PUSCH and PUCCH simultaneous transmission | X | 011 |
| Aperiodic CSI report in Full-duplex for ACK/NACK | X | 100 |
| Aperiodic CSI report in Full-duplex for CQI/PMI | X | 101 |
| Aperiodic CSI report in Full-duplex for RI | X | 110 |

Referring to Table 2, when full-duplex communication according to an embodiment of the present disclosure is applied, the CSI request field may include a value indicating one of the first method through the fourth method. For example, the CSI request field may include indication of PUCCH transmission, indication of simultaneous transmission of a PUSCH and a PUCCH, application to an ACK/NACK signal of an UL control signal, application to CQI/PMI, application to an RI, etc.

Figure 10:
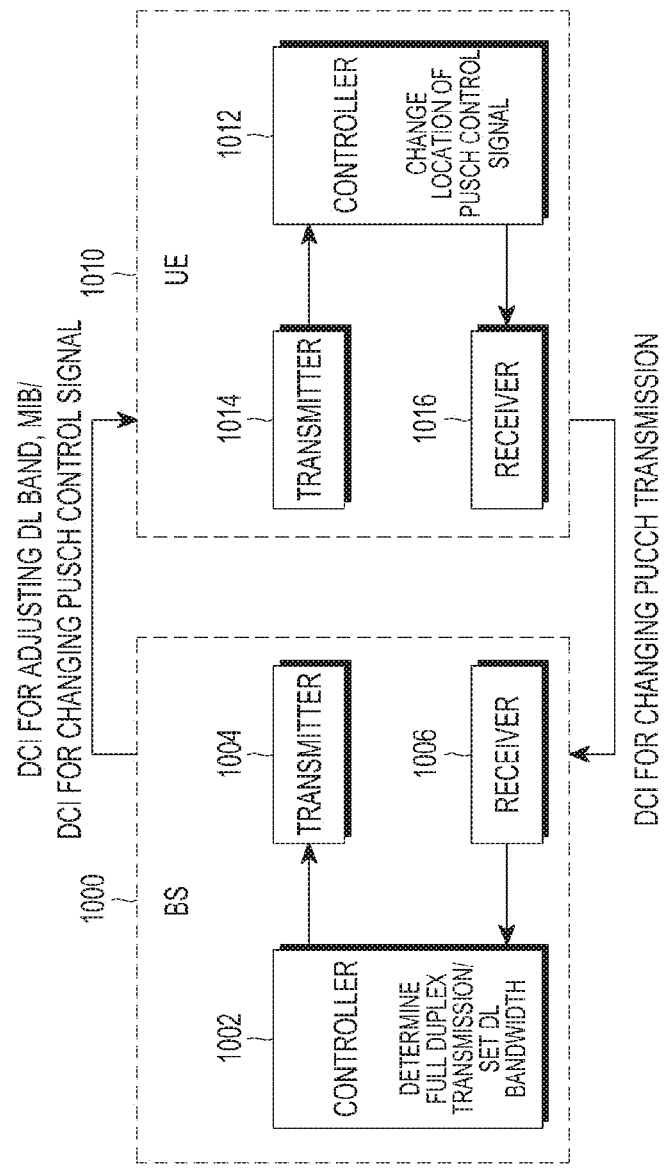
FIG. 10 is a block diagram of a BS and a UE to which an embodiment of the present disclosure is applied.

FIG. 10 is a block diagram of a BS and a UE to which an embodiment of the present disclosure is applied.

Referring to FIG. 10, a BS 1000 may include a controller 1002, a transmitter 1004, and a receiver 1006, and a UE 1010 may include a controller 1012, a transmitter 1104, and a receiver 1106. Such a configuration of a BS and a UE is described as an example, and may be divided into sub units for a corresponding operation or integrated into one unit depending on an operator's embodiment or an embodiment.

First, a BS 1000 according to an embodiment of the present disclosure sets a transmission method for reducing self-interference of an UL control signal based on the first through third embodiments described above. More specifically, the controller 1002 changes a bandwidth of a DL or an UL transmission format and delivers information about the change to the UE through the transmitter 1006 according to the first embodiment. If the controller 1002 uses at least two frequency bands according to the second embodiment, the controller 1002 sets frequency bands for an UL control signal and a DL control signal, respectively, and delivers the frequency bands to the UE through the transmitter 1006. Last, the controller 1002 according to the third embodiment determines a method for transmitting a PUSCH control signal through a PUCCH and delivers transfer information indicating the method to the UE through the transmitter 1006. A description of a detailed operation according to each embodiment overlaps the foregoing description and thus will not be provided again.

Next, once the UE 1010 recognizes reception of information related to a method for transmitting an UL control signal from the BS according to the first through third embodiments described above, the transmitter 1014 and the receiver 1016 perform full-duplex communication with the BS under control of the controller 1012.

It may be seen that in a wireless communication system according to an embodiment of the present disclosure, a BS determines a method for transmitting an UL control signal and a method and apparatus of a UE for performing corresponding transmission may be implemented by hardware, software, or a combination of hardware and software. Such arbitrary software may be stored, for example, in a volatile or non-volatile storage device (e.g., a read only memory (ROM), etc.), a memory (e.g., a random access memory (RAM), a memory chip, a memory device, or a memory integrated circuit (IC)), or a machine (e.g., computer) recordable optical or magnetic storage medium (e.g., a compact disk (CD), a digital versatile disk (DVD), a magnetic disc, a magnetic tape, etc.) regardless of its ability to erase or rewrite. It can be seen that the graphic screen update method according to the present disclosure may be implemented by a computer or a portable terminal which includes a controller and a memory, and the memory is an example of a machine-readable storage medium which is suitable for storing a program or programs including instructions for implementing the embodiment of the present disclosure.

Therefore, the present disclosure includes a program including codes for implementing an apparatus or method claimed in an arbitrary claim and a machine(computer)-readable storage medium for storing such a program. The program may be electronically transferred through an arbitrary medium such as a communication signal delivered through a wired or wireless connection, and the present disclosure properly includes equivalents thereof.

Moreover, in an embodiment of the present disclosure, in a wireless communication system, a UE may receive the program from a BS and store the same therein. The program providing device may include a memory for storing a program including instructions for instructing a graphic processing device to execute a preset method, information necessary for the method, a communication unit for performing wired or wireless communication with the graphic processing device, and a controller for transmitting a corresponding program to the graphic processing device at the request of the graphic processing device or automatically.

While embodiments of the present disclosure have been described, various changes may be made without departing the scope of the present disclosure. Therefore, the scope of the present disclosure should be defined by the appended claims and equivalents thereof, rather than by the described embodiments.

The invention claimed is:

1. A method for downlink (DL) reception in a wireless communication system, the method comprising:
   receiving, from a base station (BS), notification of a full-duplex communication;
   receiving DL control information (DCI) including scheduling information;
   obtaining offset information from the DCI, the obtained offset information indicating a first frequency band on which an uplink (UL) control signal is transmitted;
   identifying a second frequency band based on the offset information, the second frequency band being a remaining frequency band except for the first frequency band;
   transmitting the UL control signal through the first frequency band in a subframe; and
   performing the DL reception through the second frequency band in the subframe.

2. The method of claim 1, further comprising obtaining the offset information indicating the first frequency band from a master information block (MIB) received from the BS.

3. The method of claim 1, further comprising receiving configuration information for configuring the UL control signal and the DL control signal such that the UL control signal and the DL control signal are transmitted and received through different frequency bands, if the wireless communication system uses at least two frequency bands.

4. The method of claim 1, further comprising transmitting a control signal of an UL shared channel through the first frequency band, if receiving transfer information instructing transmission of a control signal of the UL shared channel from the BS through the first frequency band.

5. The method of claim 1, further comprising:
   determining a format of the UL control signal that punctures a resource region where a DL control signal received from the BS is received, in case of full-duplex communication; and
   generating the UL control signal corresponding to the format and transmitting the UL control signal to the BS.

6. The method of claim 5, further comprising,
   estimating an amount of the resource region; and
   transmitting, to the BS, symbols other than some symbols of the UL control signal corresponding to the estimated of the resource region,
   wherein the format differs with a type of the UL control signal.

7. A method for downlink (DL) transmission in a wireless communication system, the method comprising:
   transmitting, to a user equipment (UE), notification of a full-duplex communication;
   transmitting, to the UE, DL control information (DCI) including scheduling information and offset information indicating a first frequency band on which a uplink (UL) control signal is transmitted;
   receiving, from the UE, the UL control signal through the first frequency band in a subframe; and
   performing the DL transmission through a remaining frequency band except for the first frequency band in the subframe.

8. The method of claim 7, wherein the offset information indicating the first frequency band is identified from a master information block (MIB).

9. The method of claim 7, further comprising configuring the UL control signal and the DL control signal such that the UL control signal and the DL control signal are transmitted and received through different frequency bands, if the wireless communication system uses at least two frequency bands.

10. The method of claim 7, further comprising transmitting transfer information instructing transmission of a control signal of a UL shared channel through the first frequency band.

11. A user equipment (UE) for downlink (DL) reception in a wireless communication system, the UE comprising:
   a transceiver; and
   a processor configured to:
      control the transceiver to receive, from a base station (BS), notification of a full-duplex communication;
      control the transceiver to receive DL control information (DCI) including scheduling information;
      obtain offset information from the DCI, the obtained offset information indicating a first frequency band on which an uplink (UL) control signal is transmitted;
      identifying a second frequency band based on the offset information, the second frequency band being a remaining frequency band except for the first frequency band;
      control the transceiver to transmit the UL control signal through the first frequency band in a subframe; and
      control the transceiver to perform the DL reception through the second frequency band in the subframe.

12. The UE of claim 11, wherein the processor is further configured to obtain the offset information indicating the first frequency band from a master information block (MIB) received from the BS.

13. The UE of claim 11, wherein the processor is further configured to:
   control the transceiver to receive configuration information for configuring the UL control signal and the DL control signal such that the UL control signal and the DL control signal are transmitted and received through different frequency bands, if the wireless communication system uses at least two frequency bands.

14. The UE of claim 11, wherein the processor is further configured to:
   control the transceiver to transmit a control signal of an UL shared channel through the first frequency band, if receiving transfer information instructing transmission of a control signal of the UL shared channel from the BS through the first frequency band.

15. The UE of claim 11, wherein the processor is further configured to:
   determine a format of the UL control signal that punctures a resource region where a DL control signal received from the BS is received, in case of full-duplex communication, and
   generate the UL control signal corresponding to the format and transmitting the UL control signal to the BS.

16. The UE of claim 15, wherein the processor is further configured to:
   estimate an amount of the resource region, and
   control the transceiver to transmit, to the BS, symbols other than some symbols of the UL control signal corresponding to the estimated amount of the resource region,
   wherein the format differs with a type of the UL control signal.

17. A base station (BS) for downlink (DL) transmission in a wireless communication system, the BS comprising:
  a transceiver; and
  a processor configured to:
    control the transceiver to transmit, to a user equipment (UE), notification of a full-duplex communication;
    control the transceiver to transmit, to the UE, DL control information (DCI) including scheduling information and offset information indicating a first frequency band on which a uplink (UL) control signal is transmitted;
    control the transceiver to receive the UL control signal through the first frequency band in a subframe; and
    control the transceiver to perform the DL transmission through a remaining frequency band except for the first frequency band in the subframe.

18. The BS of claim 17, wherein the offset information indicating the first frequency band is identified from a master information block (MIB).

19. The BS of claim 17, wherein the processor is further configured to:
  configure the UL control signal and the DL control signal such that the UL control signal and the DL control signal are transmitted and received through different frequency bands, if the wireless communication system uses at least two frequency bands.

20. The BS of claim 17, wherein the processor is further configured to:
  control the transceiver to transfer information instructing transmission of a control signal of a UL shared channel through the first frequency band.

* * * * *